United States Patent [19]

Clark et al.

[11] Patent Number: 5,426,271
[45] Date of Patent: Jun. 20, 1995

[54] LIQUID LEVEL SENSOR

[75] Inventors: Richard A. Clark; Brad L. Cummins, both of Freeport; Timothy K. Erickson, Lena; Brian D. Mc Bride; Gary R. O'Brien, both of Freeport, all of Ill.

[73] Assignee: Honeywell Inc., Minneapolis, Minn.

[21] Appl. No.: 183,012

[22] Filed: Jan. 18, 1994

[51] Int. Cl.⁶ .......................................... H01H 35/18
[52] U.S. Cl. ................................. 200/84 C; 73/317; 200/51 R; 340/625
[58] Field of Search .............. 73/308, 313, 317, 322.5; 417/40; 340/623, 625; 307/118; 338/32 H; 335/205; 200/51 R, 61.2, 61.52, 84 R, 84 C

[56] References Cited

U.S. PATENT DOCUMENTS

| | | | |
|---|---|---|---|
| 4,489,224 | 12/1984 | Steer | 200/84 C |
| 4,598,584 | 7/1986 | Dombrowski | 73/308 |
| 4,864,665 | 9/1989 | Toltzman . | |
| 4,911,011 | 3/1990 | Fekete | 73/313 |
| 4,917,795 | 4/1990 | Sable et al. . | |
| 4,920,797 | 5/1990 | Swartz | 73/309 |
| 4,952,352 | 8/1990 | Shin | 264/51 |
| 5,134,729 | 8/1992 | Shaw . | |
| 5,250,768 | 10/1993 | Van Fossen . | |

OTHER PUBLICATIONS

Article "Molding Masterpieces" by Richard J. Babyak in Nov. 1993 Appliance Manufacturer.

*Primary Examiner*—Gerald P. Tolin
*Attorney, Agent, or Firm*—William D. Lanyi

[57] ABSTRACT

A liquid level sensor is provided with a single piece pivotable device which is used to move a permanent magnet into and out of the detection zone of a magnetically sensitive component, such as a Hall effect element. The pivotable device comprises a buoyant portion, a magnet holding portion and a pivot portion with arms connecting the pivot portion to the buoyant portion and the magnet holding portion. The pivot portion of the pivotable device is shaped to be received over a fixed post attached to a container. The injection gate of the mold used to form the pivotable device is advantageously located so that the pressures throughout the mold cavity are positive to the action of the foaming agent to result in the buoyant portion of the pivotable device having a significantly lower density than the other portions of the pivotable device. This variable density in a single piece device permits a smaller overall size to be used without sacrificing the sensitivity needed to detect changes in a liquid level.

8 Claims, 7 Drawing Sheets

LIQUID LEVEL SENSOR

BACKGROUND OF THE INVENTION

1. Field of the Invention

The present invention is generally related to float switches and, more particularly, to a float switch which incorporate a single-piece pivotable device which moves a permanent magnet along an arcuate path in response to changing levels of a fluid within a containment.

2. Description of the Prior Art

Many different types of fluid level sensors are well known to those skilled in the art. Some of these devices utilize a buoyant member which is moved in response to a changing liquid level. The movement of the buoyant member is typically utilized to activate a switch or a valve mechanism.

U.S. Pat. No. 5,250,768, which issued to Van Fossen on Oct. 5, 1993, discloses a float switch with a snap action member. The switch is intended for sensing a liquid level and then switching its state in response to changes in the level. The device is carried within a hollow housing with its movement being restrained by the tethering action of a power cord. Snap action switching is achieved by the interaction between an actuator having camming surfaces formed on its exterior and a spring loaded switch mechanism. The mechanism includes a thin, flexible E-shaped snap member having two legs bowed to form a leaf spring and having a bearing point located on the central leg.

U.S. Pat. No. 5,134,729, which issued to Shaw on Aug. 4, 1992, describes a positive shut off, metered control system for use with flush toilet tanks. The device is intended for metering the flow of water into the tank and bowl of any currently known tank toilet and providing positive shut off of the flow. When the toilet handle is turned, a linkage rotates a cam to force a stopper from its seat. This action commences water flow. The water flows through a flow channel to be directed by a flow nozzle past a water wheel imparting a rotation thereto. The water wheel is gearably linked to the cam thereby rotating the cam. When the cam has rotated to position a cam repeat over the stopped stem, the stopper is receipted by the pressure of the water and water flow ceases.

U.S. Pat. No. 4,917,795, which issued to Sable et al on Apr. 17, 1990, discloses an automatic valve assembly with an improved automatic air pressure relief and check valve assembly which can be used in combination with a swimming pool filter tank or a swimming pool separation tank. The valve assembly includes a normally open lower valve which communicates with the inside of the tank and is responsive to the tank's being full of pressurized water for closing the lower valve. The valve assembly further includes a normally closed upper valve communicating with the lower valve and the outside of the tank. The upper valve is responsive to air being expelled from the tank through the open lower valve when water is refilling the tank. Cooperating with the upper and lower valve of the improved valve assembly is a means for precluding both the upper and lower valves from being simultaneously maintained in their closed positions.

An article, titled "MOLDING MASTERPIECES", by Richard J. Babyak in the November 1993 issue of Appliance Manufacturer, describes a low pressure molding technique which provides certain advantages in the manufacture of injection molded components. The article describes several molding techniques that are made possible by a particular low pressure molding process. One of those techniques is described as a dual density process that yields sandwich moldings having a hard and compact skin and an expanded cellular core that are both made of the same resin on the same injection molding device. This technique is described as providing rigidity and thickness while minimizing weight and resin costs. Although this particular technique is not described in significant detail in this magazine article, it appears to relate to the use of two different moldings sequentially manufactured on the same injection molding machine to result in a hard skin layer surrounding a lower density core. It is believed that the term "sandwich" implies this construction. Nothing in this article describes a technique for manufacturing a single piece component that has a low density portion and a higher density portion that are formed during a single injection process.

U.S. Pat. No. 4,864,665, which issued to Toltzman on Sep. 12, 1989, describes a dual flush system for toilets. The system is intended to effect a partial or mini-flush of the toilet to carry away liquid waste by partially opening the main valve situated in the water holding tank of a toilet for a period of time determined by an operator. The described device provides a means for the upward lifting of the main valve by limiting the rotational movement of the lever arm connected to the main valve by a cord or chain. Upward movement of the lever arm is limited within the flush handle assembly connected to the lever arm. A partial flush handle movement is terminated by sticking a modified excentrically shaped cam situated within a hollowed-out cavity in the partial flush handle and a full flush handle is provided to continue raising the lever arm to effect a full flush.

The principle of using a buoyant member to respond to changes in water level and thereby actuate a switch or a valve is known to those skilled in the art. This type of device has been used to control the water level in toilet tanks for many years. Devices of this general type are also used in apparatus, such as dishwashers, for the purpose of determining when a particular fluid container needs to be refilled. For example, the container may be intended to hold dish washing detergent or other fluids for use during the dish washing cycle.

For use in certain applications, it is necessary to provide a rugged fluid level sensor which also provides an accurate indication of the level of a liquid. Furthermore, it is advantageous to provide a liquid level sensor which is easily manufacturable. Several of these goals are achievable through the use of a single piece rotatable device having a buoyant portion and a magnet holding portion.

SUMMARY OF THE INVENTION

A liquid level sensor made in accordance with the present invention comprises a single-piece pivotable device that has a buoyant portion, a magnet holding portion and a pivot portion. The pivot portion is shaped to receive a fixed post in sliding rotation therein and be rotatable about the fixed post. The buoyant portion is connected to the pivot portion by a first arm and the magnet holding portion is connected to the pivot portion by a second arm. The buoyant portion, the magnet holding portion, the first arm and the second arm are all made of the same material to form a single piece pivotable device. The buoyant portion has a lower density than the first arm, the second arm, the pivot portion and the magnet holding portion. The single piece pivotable device is made by injecting a mixture of a plastic material and a foaming agent into a mold which is shaped to form the pivotable device. The mixture is injected into the mold at a preselected portion of the mold to cause increased foaming of the material within the buoyant portion relative to the magnet holding portion, the pivot portion, the first arm and the second arm.

By using a foaming agent mixed with a plastic material and by injecting the mixture into a mold at a particular location, the buoyant portion of the single piece pivotable device has a significantly lower density than the other portions of the pivotable device. This allows a rotatable sensor to be manufactured without the necessity of assembling multiple pieces together. In addition, although the present invention provides a buoyant portion of the pivotable device, it also provides a rugged structure with a relatively hard surface that permits accurate dimensions and tolerances to be maintained and prevents undue wear and abrasion through the normal use of the fluid level sensor. In addition, it provides a pivotable device that can be manufactured as a single piece.

BRIEF DESCRIPTION OF THE DRAWINGS

The present invention will be more fully understood from a reading of the Description of the Preferred Embodiment in conjunction with the drawings, in which.

DESCRIPTION OF THE PREFERRED EMBODIMENT

Throughout the Description of the Preferred Embodiment, like components will be identified by like reference numerals.

Figure 1:
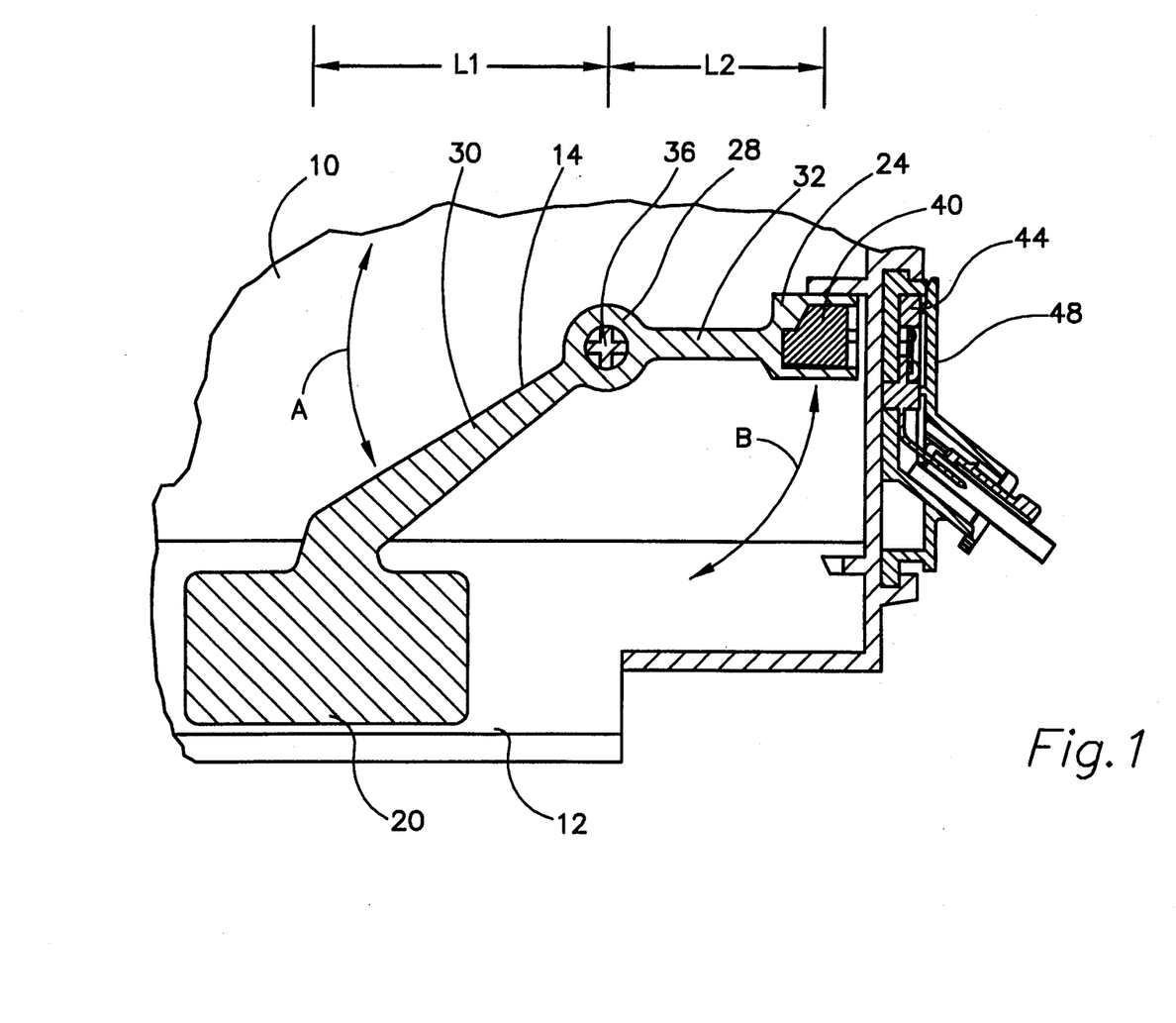
FIG. 1 is a section view of a container and a pivotable device made in accordance with the present invention.

FIG. 1 illustrates a sectional view of a container 10 which is intended to contain a liquid. The present invention is intended to facilitate the measurement of the liquid level above the bottom portion 12 of the container 10. The liquid level sensor of the present invention comprises a pivotable device 14 that, in turn, comprises a buoyant portion 20, a magnet holding portion 24, a pivot portion 28, a first arm 30 and a second arm 32. The pivot portion 28 is shaped to receive a fixed post 36 therein. The fixed post 36 is attached to the container 10.

As shown in FIG. 1, the single piece pivotable device 14 can rotate about the fixed post 36 because of the sliding relationship provided between the pivot portion 28 and the fixed post 36. As a liquid level rises above the bottom portion 12 of the container 10 and raises the buoyant portion 20, the first arm 30 rotates about the center of the fixed post 36 along the path indicated by arrow A. In response to this movement of the buoyant portion 20, the magnet holding portion 24 rotates about the center of the fixed post 36 along the path represented by arrow B in FIG. 1.

With continued reference to FIG. 1, the magnet holding portion 24 is shaped to receive a permanent magnet 40. When the buoyant portion 20 rises from the bottom portion 12 of the container 10 in response to an increased amount of liquid therein, the magnet 40 is moved downward along the path indicated by arrow B and away from the detection zone of a magnetically sensitive component, such as the Hall effect element 44. The magnetically sensitive component is contained within a sensor package 48 which will be described in detail below in conjunction with FIGS. 2 and 3. When the magnet 40 is moved away from the detection zone of the Hall effect element 44, associated circuitry detects this movement and determines that a sufficient amount of liquid is contained within container 10. If, on the other hand, the magnet 40 is within the preselected detection zone of the Hall effect element 44, the associated circuitry can determine that insufficient liquid is available within the container 10 because of the lowered position of the buoyant portion 20 near bottom portion 12 of the container 10.

As will be described in greater detail below, it is important to provide sufficient buoyancy in the portion of the pivotable device 14 to the left of the fixed post 36 to move the magnet holding portion 24 away from the detection zone of the Hall effect element. Although many different types of plastics are available which exhibit a buoyant characteristic, the net buoyance of the left portion of the pivotable device must be greater than the right portion of the pivotable device in order for the system to operate properly. The use of the buoyant portion 20 increases the volume, and therefore the fluid displacement, of the left portion of the pivotable device in comparison to the right portion. To further increase this relative buoyancy of the left portion of the pivotable device, a foaming agent is used to decrease the density of the material of the pivotable device in the region of the buoyant portion 20. It should be understood that the plastic material used during the injection molding process of forming the single piece pivotable device 14 is generally homogeneous and comprises both a plastic material, such as polypropylene, polyethylene, polyamide or polyoxymethylene, and a foaming agent, such as azodicarbonamide. It should be understood that alternative plastics and foaming agents can also be used within the scope of the present invention. The particular process used to manufacture the present invention results in this generally homogeneous material behaving differently in different regions of the pivotable device 14. In other words, the foaming agent has a different effect on the material in the region of the buoyant portion 20 than it does in the region of the magnet holding portion 24 or the second arm 32. It should also be realized that when the buoyant portion 20 has a significantly lower density that the remaining portions of the single piece pivotable device 14, the length of the moment arm L1 can be significantly shortened with respect to the length of moment arm L2. This permits the overall size of the pivotable device 14 to be reduced. This, in turn, permits the device to be used as a liquid level sensor in spaces having a relatively small volume.

Figure 2:
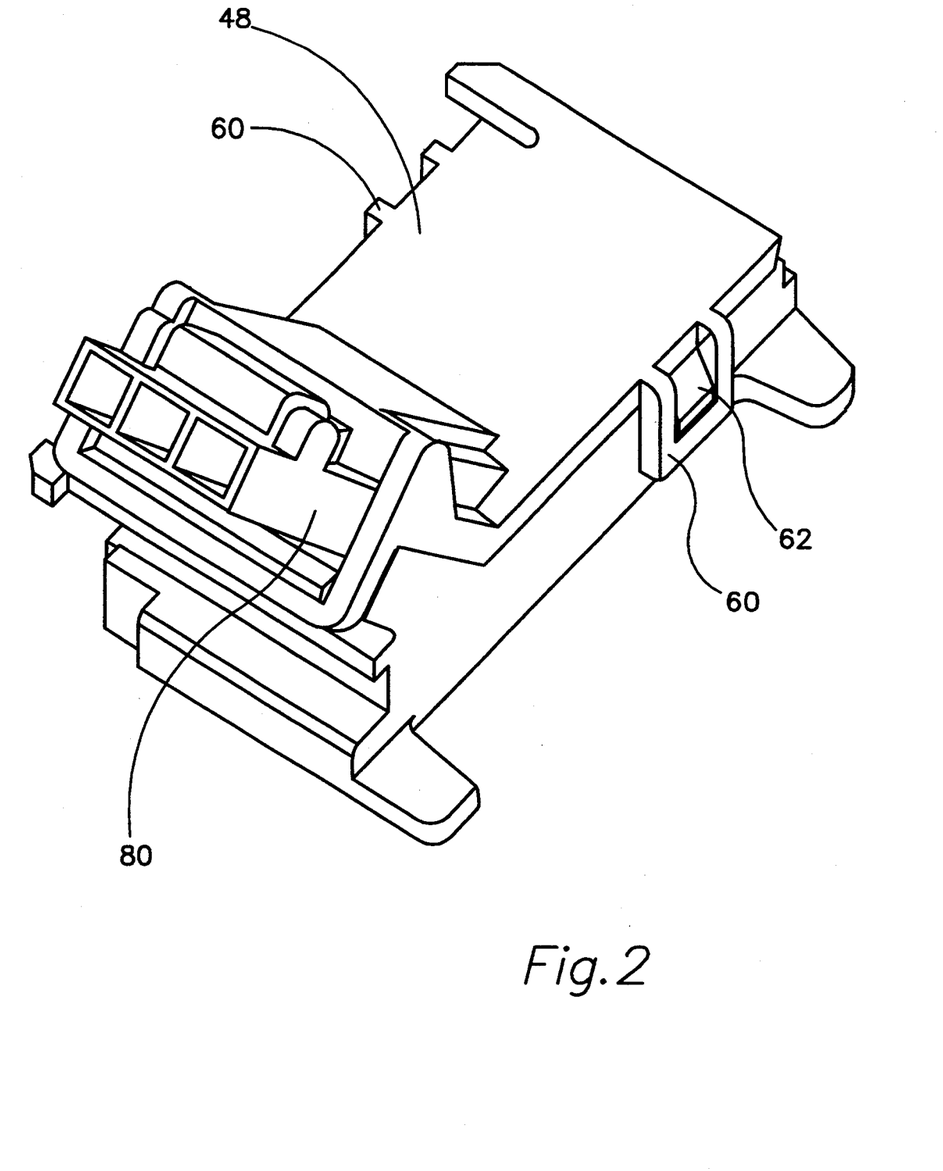
FIG. 2 illustrates a particular embodiment of a sensor housing used in conjunction with the pivotable arm of the present invention.
Figure 3:
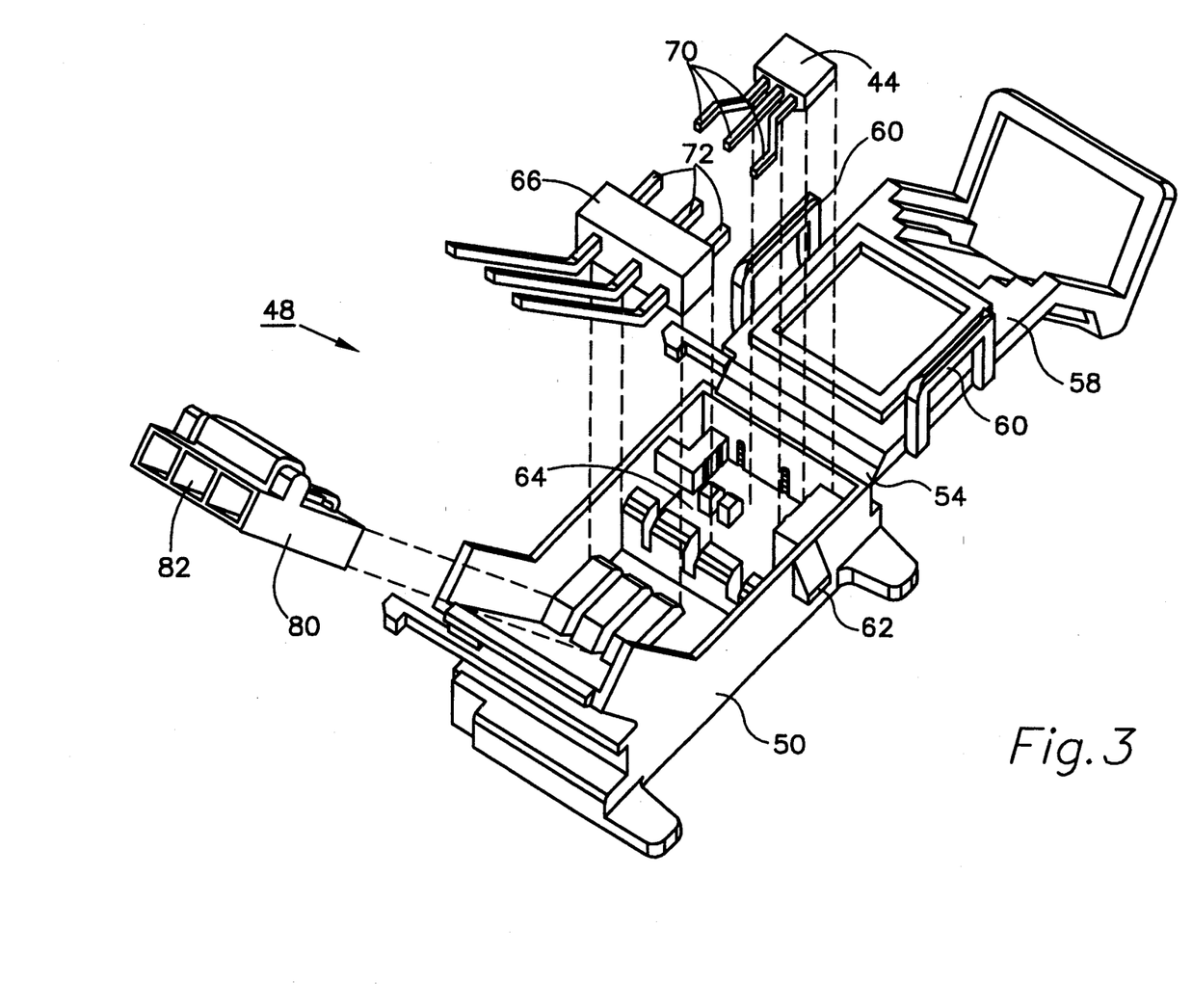
FIG. 3 is an exploded view of the sensor housing shown in FIG. 2.

FIG. 2 illustrates the sensor package 48 of the present invention. FIG. 3 is an exploded view of the package 48 shown in FIG. 2. The overall structure of the sensor package 48 is intended to permit easy assembly of the components. The shell 50 comprises two sections which are connected together by a flexible hinge 54. By rotating the upper section 58 about the hinge 54, it can be snapped into position in locked relation with the other portion of the housing 50. When this occurs, the bails 60 snap over the lugs 62 to hold the cover portion firmly in place relative to the bottom portion. Inside the cavity 64 of the sensor housing 48, a lead frame member 66 is disposed in a position as indicated and a Hall effect element 44 is placed at a location where electrical connection can be made between its leads 70 and the leads 72 of the lead frame member 66 by soldering or other appropriate methods. The opposite end of leads 72 are shaped to be directed upward at a preselected angle to permit them to be connected in electrical communication with a connector 80 from an external apparatus. Although not shown in FIGS. 2 and 3, it should be understood that conductors would be inserted into the openings 82 of the connector 80.

Although the sensor housing 48 is shown in considerable detail in FIG. 3, it should be understood that the particular means provided for supporting the Hall effect element 44 at a preselected position relative to the path along which the magnet 40 travels can be accomplished in many different ways and is not limiting to the scope of the present invention. The device shown in FIGS. 2 and 3 permits the Hall effect element 44 to be placed at a particular location relative to the container 10 and also permits easy manufacture and assembly.

Figure 4:
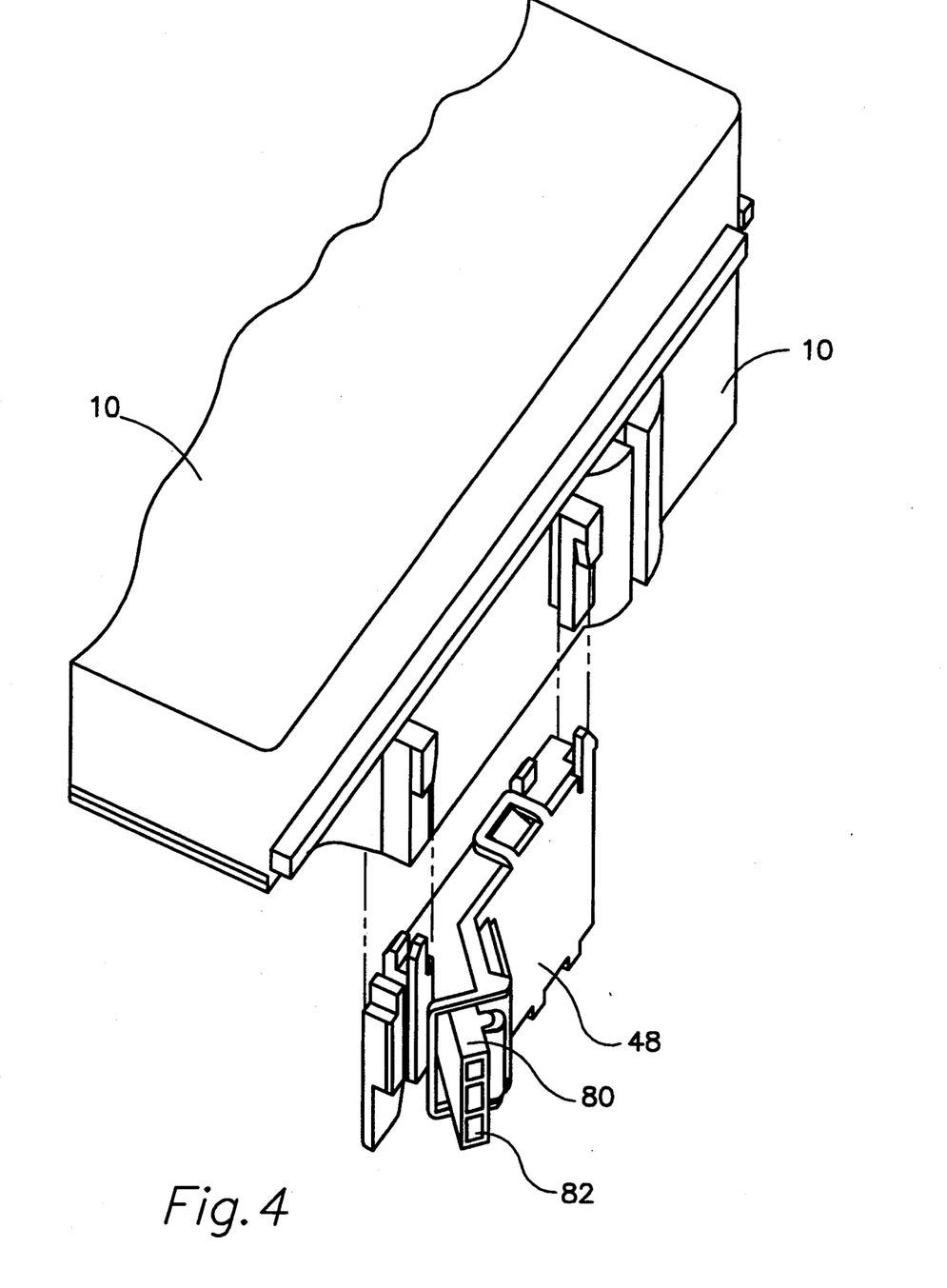
FIG. 4 is an exploded view showing the relationship between the sensor housing and the container of liquid used in conjunction with it.
Figure 5:
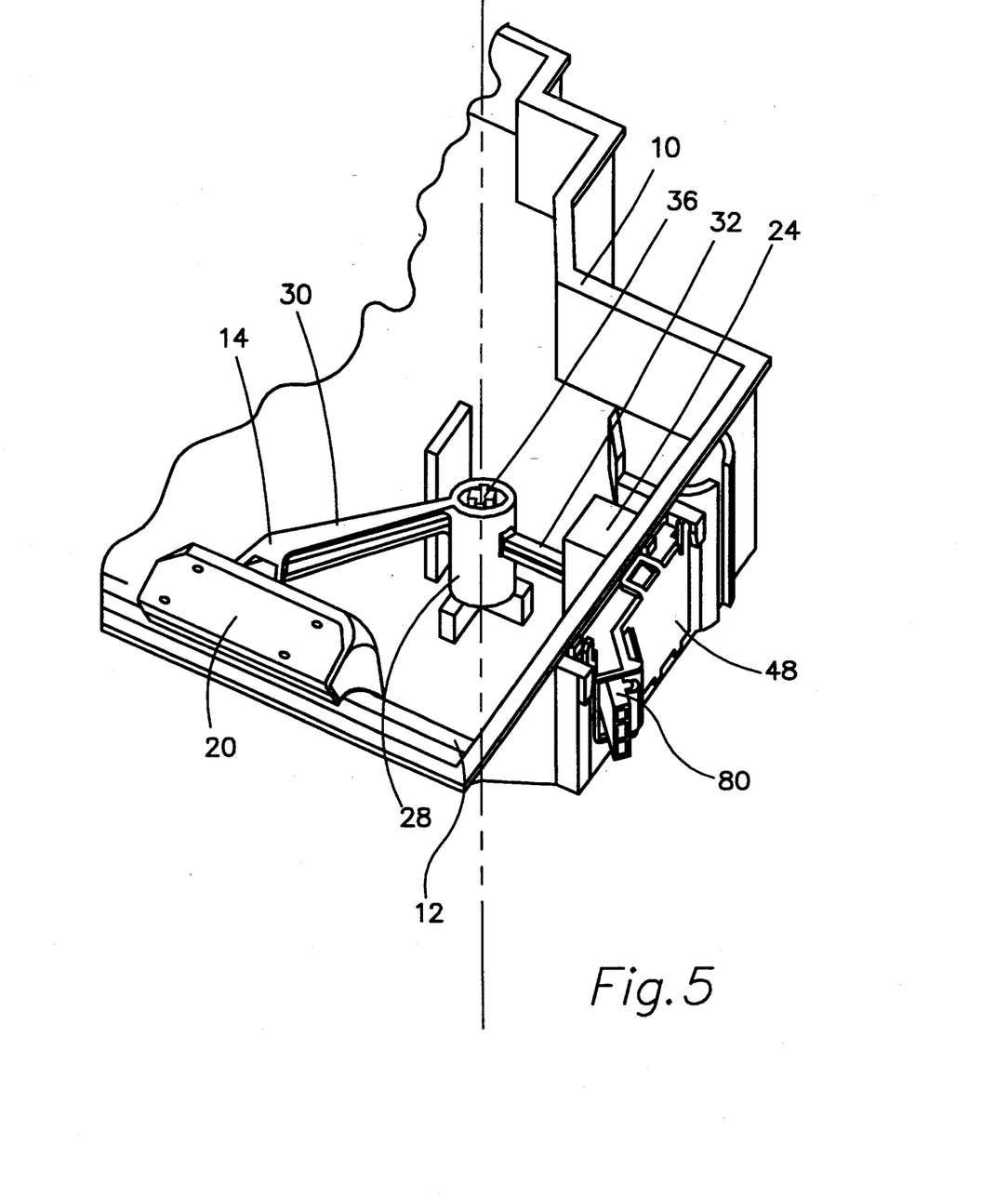
FIG. 5 shows a partial illustration of a container along with a perspective view of the pivotable device of the present invention.
Figure 6:
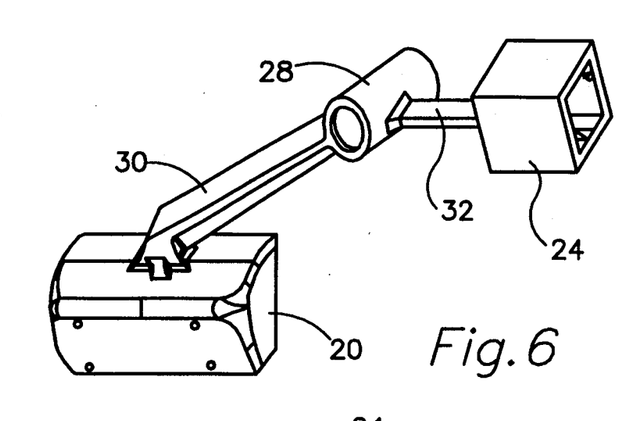
FIGS. 6, 7, 8 and 9 show various views of the pivotable device of the present invention.
Figure 7:
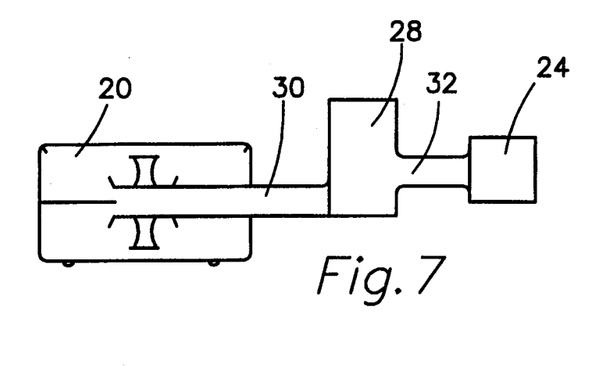
Figure 8:
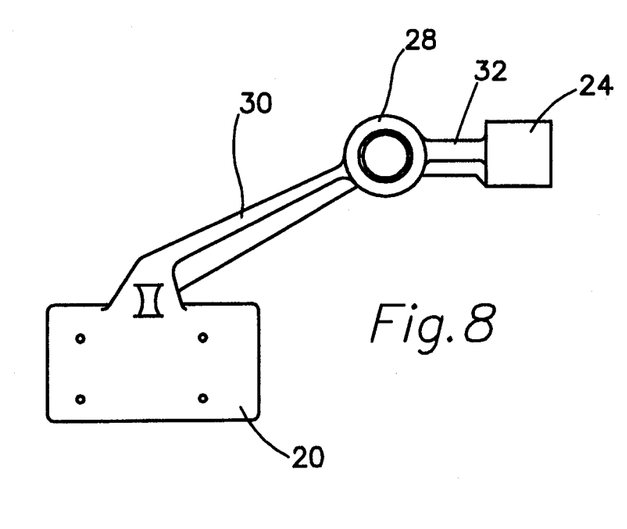
Figure 9:
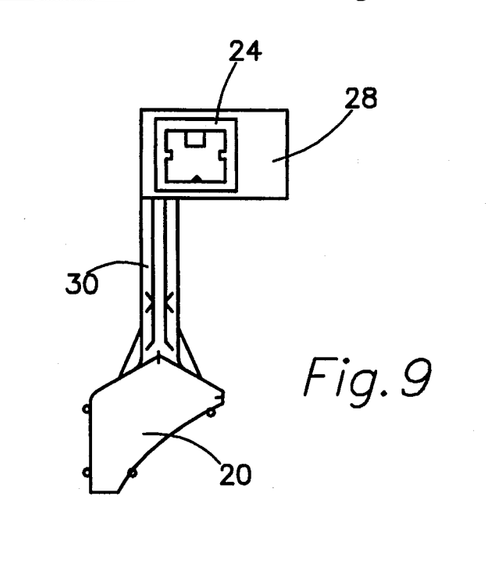

With reference to FIGS. 4 and 5, it can be seen that the sensor housing 48 is shaped to be snapped into position at the side of container 10. Once the sensor is placed in position, the connector 80 can be inserted into the sensor housing 48 to provide electrical connection between the Hall effect element 44 and external circuitry. FIG. 5 shows the container 10 with a portion of its structure removed. Inside the portion of the container 10 shown in FIG. 5, the fixed post 36 can be seen extending from and attached to the container 10. The pivot portion 28 of the pivotable device 14 is disposed around the fixed post 36 as described above in conjunction with FIG. 1. The buoyant portion 20 shown in FIG. 5 is shaped to conform to the shape of the bottom portion 12 of the container 10. However, it should be understood that this particular shape of the buoyant portion 20 is not limiting to the scope of the present invention. Alternative shapes can be incorporated in pivotable devices according to the concepts of the present invention.

With continued reference to FIG. 5, it can be seen that the sliding relationship between the fixed post 36 and the pivot portion 28 of the pivotable device 14 necessitates a relatively rigid and wear resistant structure of the pivotable device in order to avoid its premature failure in the locations where the surface of the pivotable device in sliding relation. This requirement normally dictates that certain plastics be selected for the material of which the pivotable device is made. Unfortunately, many of the most preferable plastics for this purpose do not have a sufficiently low density to permit the pivotable device 14 to be made of a sufficiently small size to be useful in confined areas such as the one illustrated in FIG. 5. One solution would be to provide a low density float portion attached to a higher density, and stronger, support and pivot portion. However, this two piece assembly would require additional manufacturing time and costs. It is much more efficient to utilize a single piece structure that can be injection molded in a single operation. The present invention provides a single piece structure that can be made of a durable plastic material, but which also has a buoyant portion with a significantly lower density than the other portions of the device. This variable density is achieved by providing a foaming agent as part of the mixture of plastic in the injection molding process and, in addition, by particularly selecting the position where the gate is connected to the mold into which the molten plastic is injected to form the single piece pivotable device. By appropriately selecting the foaming agent and the location of the gate relative to the mold, the pressure and temperature of the molten plastic and foaming agent mixture are such that the pressure drop between the gate location and the location of the buoyant portion 20 permits the foaming agent to be much more effective in the region of the buoyant portion than in the region of the pivot portion, the first and second arms, and the magnet holding portion. This result is precisely the one needed to provide the additional buoyancy of the buoyant portion 20 while maintaining the higher rigidity and strength of the arms, the pivot portion and the magnet holding portion so that they can perform their functions satisfactorily during operation. FIGS. 6, 7, 8 and 9 show various views of the size and shape of the single piece pivotable device.

Figure 10:
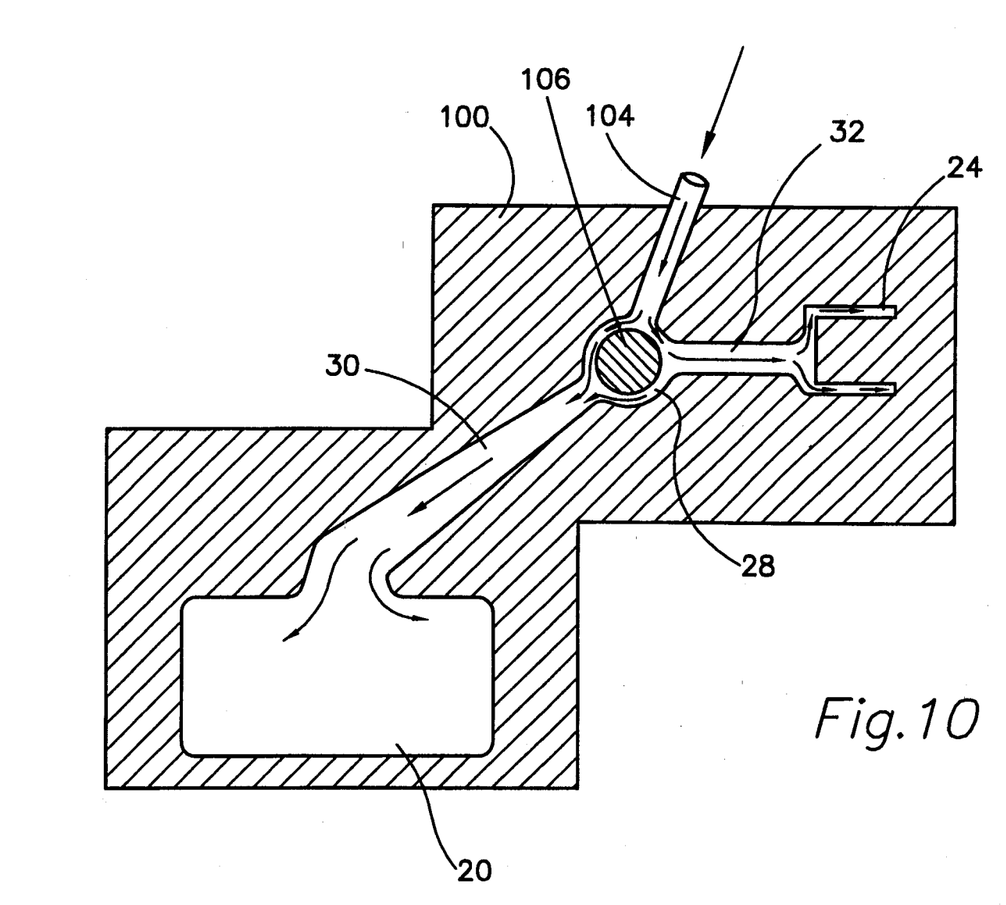
FIG. 10 illustrates an exemplary schematic illustration of an injection molding mold in order to permit the preferred location of an injection gate to be shown.

FIG. 10 illustrates an exemplary mold for the purpose of showing the manner in which the single piece pivotable device is injection molded in a preferred embodiment of the present invention in order to achieve the desirable characteristics provided by the variable density of the device. The mold 100 is shown in a highly simplified schematic illustration in FIG. 10 in order to facilitate the following discussion. However, it should be understood that the particular size and shape of the mold 100 would depend many factors, including on the particular injection molding machine used to manufacture the single piece pivotable device 14. The gate 104 is disposed as far as possible from the buoyant portion 20 without adversely affecting other requirements of the injection molding process. Because of the required presence of the core 106, which forms the opening in the molded single piece pivotable device necessary to receive the fixed post 36, it was determined that the gate 104 should not be located in the region of the magnet holding portion 24. Because of the tortuous path necessary for the molten plastic to pass from the magnet holding region, through the second arm 32, around the core 106 in the pivot portion 28, along the first arm 30 and eventually into the buoyant portion 20, the significant pressure differentials between the gate location and the buoyant portion would likely result in possible malformations of the pivotable device structure. It was determined that if the gate 104 was disposed in contact with the pivot portion 28 region of the mold 100, the molten mixture of plastic and foaming agent could rapidly move through the second arm 32 and into the region of the magnet holding portion prior to any significant foaming activity. This is a result of the pressure and temperature of molten liquid in the region between the gate and the magnet holding portion. The molten plastic which passes from the gate 104 in the direction through the first arm 30, experiences a pressure drop as it passes downward and toward the left in FIG. 10. This pressure drop permits the foaming agent to begin its expected reaction in combination with the plastic material. By the time that the mixture reaches the buoyant portion 20, the foaming agent experiences a sufficiently low pressure to begin its expected action which results in the lowering of the density in the buoyant portion 20. The other portions of the single piece pivotable device 14 experience higher pressures during the molding process and therefore the foaming agent in those regions is not provided with the same opportunity to decrease the density of those portions of the device. The increased density of the other portions of the pivotable device result in increased strength and durability. This is particularly important in the region of the pivot portion which must withstand the potential abrasion from its sliding relation with the fixed post 36.

In order to accomplish the advantages of the present invention, several concepts were utilized. As illustrated in the figures and described above, the buoyant portion 20 is made much larger than the other portions of the mechanism, such as the first arm 30, the magnet holding portion point 24, the pivot portion 28 or the second arm 32. This larger volume permits the foaming agent to more effectively decrease the density of the material being injected into gate 104. In addition, the arrangement of the buoyant portion 20 with respect to the location of the gate 104 provides a pressure drop between the gate 104 and the buoyant portion 20. As the molten material is injected into gate 104 and passes through the first arm 30, it experiences a progressively decreasing pressure. Because of the lower pressure in the buoyant portion 20 of the mold, the foaming agent experiences less resistance to expansion of the molten material. This permits it to freely expand as much as the space will allow. Another factor that contributes to the successful manufacture of a mechanism in accordance with the present invention is the careful monitoring of the quantity of material injected into the mold. The quantity of molten material, with respect to the volume of the mold, can be empirically determined through trial runs of the process. It has been determined that an increase in the quantity of molten material injected into the mold can have an adverse effect on the buoyancy of the buoyant portion 20 if that quantity of molten material is more than sufficient to fill the entire mold cavity. When more material is injected than is necessary, the pressure within the buoyant portion 20 of the mold cavity is increased and the action of the foaming agent is inhibited because of that increased pressure and increased volume of material.

It has also been found that the temperature in the region of the injection molding machine barrel has an effect of the success of the process. If the temperature of the barrel is too high, premature foaming of the mixture within the barrel can occur. Naturally, the temperature must be sufficiently high to maintain the molten state of the plastic material, but not high enough to result in premature foaming. The precise temperature necessary to achieve these two goals will vary from one injection molding machine to another, but it has been found that a temperature of the molding machine barrel slightly less than 350 degrees fahrenheit will result in a successful injection molding operation with significant foaming in the region of the buoyant portion 20. The hydraulic pressure during injection was approximately 300 psi and the pressure of the material in the buoyant portion of the device was approximately 40 to 75 psi.

With reference to FIG. 10 and the above discussion it should be apparent that placing the gate 104 in the bottom left portion of the mold, in fluid communication with the buoyant portion 20, would result in premature foaming as the material passes through the buoyant portion 20 and into the first arm 30. This foaming would continue as the molten material passed the pivot portion and into the second arm 32. The resulting mixture would have a density in the region of the second arm 32 and the magnet holding portion 24 at least as low as the density within the buoyant portion 20. This construction would be counterproductive to the intended operation of the end product.

The combination of concepts and techniques described above results in a single piece pivotable device that does not require the assembly of multiple components. In addition, it incorporates the significantly advantageous characteristic of having one portion of its structure being a lower density than the other portions of its structure. In other words, the low density of the buoyant portion improves the operation of the float mechanism while the higher density of the arms and support portions of the device improves its strength and durability. As a result, a relatively inexpensive component exhibits advantageous characteristics at both its buoyant portion and its strength portions without requiring complex and expensive assembly procedures. Although the present invention has been described in significant detail and illustrated with particular specificity to describe a most preferred embodiment of the present invention, it should be understood that alternative embodiments are within its scope. In other words, although very specific plastics and foaming agents have been identify as being used in a most preferred embodiment of the present invention, many alternative materials can also be used within its scope. Furthermore, although a particular shape of a pivotable device has been illustrated and described above, alternative shapes can utilize the advantageous concepts of the present invention to result in a single piece component that varies in density from one portion to another.

The embodiments of the invention in which an exclusive property or right is claimed are defined as follows:

1. A liquid level sensor, comprising:
   a buoyant portion;
   a magnet holding portion; and
   a pivot portion being shaped to receive a fixed post, said pivot portion being rotatable about said fixed post, said buoyant portion being connected to said pivot portion by a first arm, said magnet holding portion being connected to said pivot portion by a second arm, said buoyant portion, said magnet holding portion, said first arm and said second arm being made of a the same material to form a single piece pivotable device with a varying density, said buoyant portion having a lower density than said first arm, said second arm, said pivot portion and said magnet holding portion, said single piece pivotable device being made by injecting a mixture of a plastic material and a foaming agent into a mold shaped to form said pivotable device, said mixture being injected into said mold at a preselected portion of said mold to cause increased foaming and decreased density of said material within said buoyant portion relative to a decreased foaming and increased density of said material within said magnet holding portion, said pivot portion, said first arm and said second arm.

2. The sensor of claim 1, further comprising:
a permanent magnet disposed in said magnet holding portion.

3. The sensor of claim 1, wherein:
said plastic material is polypropylene.

4. The sensor of claim 1, wherein:
said foaming agent is azodicarbonamide.

5. The sensor of claim 1, further comprising:
a container comprising said fixed post, said pivot portion of said single piece pivotable device being disposed about said fixed post.

6. The sensor of claim 5, further comprising:
a magnetically sensitive component attached to said container, said magnetically sensitive component being disposed proximate a portion of an arc along which said permanent magnet is movable in response to rotation of said single piece pivotable device about said fixed post.

7. The sensor of claim 6, wherein:
said magnetically sensitive component is disposed at an external portion of said container.

8. The sensor of claim 6, wherein:
said magnetically sensitive component is a Hall effect element.

* * * * *